United States Patent
Reinholdsson et al.

(10) Patent No.: US 7,286,823 B2
(45) Date of Patent: *Oct. 23, 2007

(54) MOBILE MULTIMEDIA ENGINE

(75) Inventors: Mikael Reinholdsson, Malmö (SE); Erik Ledfelt, Vellinge (SE); Johan Svenér, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 435 days.

This patent is subject to a terminal disclaimer.

(21) Appl. No.: 10/359,910

(22) Filed: Feb. 7, 2003

(65) Prior Publication Data

US 2003/0224770 A1 Dec. 4, 2003

Related U.S. Application Data

(60) Provisional application No. 60/357,291, filed on Feb. 15, 2002, provisional application No. 60/412,756, filed on Sep. 23, 2002, provisional application No. 60/412,875, filed on Sep. 23, 2002.

(51) Int. Cl.
*H04Q 7/20* (2006.01)
*H04M 3/00* (2006.01)
*H04M 3/42* (2006.01)

(52) U.S. Cl. ............... 455/419; 455/403; 455/418
(58) Field of Classification Search ............... 455/3.05, 455/412, 403, 418, 419, 412.1; 709/217, 709/218, 219; 463/42, 40

See application file for complete search history.

(56) References Cited

U.S. PATENT DOCUMENTS

| | | | |
|---|---|---|---|
| 5,745,761 A | 4/1998 | Celi, Jr. et al. ............. | 395/681 |
| 6,044,408 A | 3/2000 | Engstrom et al. | |
| 6,269,396 B1 | 7/2001 | Shah et al. ................. | 709/223 |
| 6,289,396 B1 | 9/2001 | Keller et al. ................ | 709/323 |
| 6,317,659 B1 | 11/2001 | Lindsley et al. .............. | 701/1 |
| 6,600,917 B1* | 7/2003 | Maupin .................... | 455/414.1 |
| 6,908,389 B1* | 6/2005 | Puskala ..................... | 463/40 |
| 7,076,552 B2* | 7/2006 | Mandato .................... | 709/226 |

(Continued)

FOREIGN PATENT DOCUMENTS

EP 1 074 911 A2 2/2001

(Continued)

OTHER PUBLICATIONS

New York, USA, Apr. 2000 Aspects & Crosscutting in Layered Middleware Systems by Lodewijk M.J. Bergmans et al.; Trese Group-Center for Telematics and Information Technology (CTIT); pp. 1-3.

(Continued)

*Primary Examiner*—Tilahun Gesesse
(74) *Attorney, Agent, or Firm*—Michael Cameron (57) ABSTRACT

A mobile multimedia system for a mobile terminal for a wireless telecommunications system and a method for enabling multimedia applications in a mobile terminal. The system includes a mobile multimedia engine having a software services component and a hardware component associated with and controlled by said software services component, and an interface component having at least one interface for providing access to the mobile multimedia engine. The system further includes multimedia application software loaded, installed and run in said mobile multimedia engine via the at least one interface in said interface component.

20 Claims, 7 Drawing Sheets

U.S. PATENT DOCUMENTS

| | | | |
|---|---|---|---|
| 7,149,510 B2* | 12/2006 | Hansson et al. | 455/418 |
| 2002/0002510 A1* | 1/2002 | Sharp et al. | 705/26 |
| 2002/0029378 A1 | 3/2002 | Larsson | 717/159 |
| 2002/0069065 A1 | 6/2002 | Schmid et al. | 704/270 |
| 2002/0087656 A1* | 7/2002 | Gargiulo et al. | 709/217 |
| 2002/0102966 A1* | 8/2002 | Lev et al. | 455/412 |
| 2002/0132616 A1* | 9/2002 | Ross et al. | 455/419 |
| 2002/0133566 A1* | 9/2002 | Teeple | 709/218 |
| 2003/0084106 A1* | 5/2003 | Erev et al. | 709/206 |
| 2003/0181193 A1* | 9/2003 | Wilhelmsson et al. | 455/403 |
| 2003/0224769 A1* | 12/2003 | Solve et al. | 455/418 |
| 2004/0102187 A1* | 5/2004 | Moller et al. | 455/418 |

FOREIGN PATENT DOCUMENTS

| | | |
|---|---|---|
| WO | WO 98/19239 | 5/1998 |
| WO | WO 99/49394 | 9/1999 |
| WO | WO 00/08611 | 2/2000 |
| WO | WO 00/72586 A2 | 11/2000 |
| WO | WO 01/14960 A2 | 3/2001 |
| WO | WO 01/41393 A2 | 6/2001 |
| WO | WO 01/50282 A1 | 7/2001 |
| WO | WO 01/88707 A2 | 11/2001 |
| WO | WO 02/33879 A2 | 4/2002 |
| WO | WO 02/35351 A1 | 5/2002 |

OTHER PUBLICATIONS

Supporting the Design of Adaptable Operating Systems Using Aspect-Oriented Frameworks by Paniti Netinant et al.; International Conference on Parallel and Distributed Processing Techniques and Applications (PDPTA 2000); Las Vegas, Nevada; Jun. 26-29, 2000; 7 Pages.

A Layered Approach to Building Open Aspect-Oriented Systems by Paniti Netinant et al.; Communications of the AC; Oct. 2001; Vol. 44, No. 10; pp. 83-85.

Seminar studium (date unknown) submitted for publication Aspect-Oriented Programming by Silvia Breu; pp. 1-22.

Draft: Aspect-Design in the Building-Block Method by Jürgen K. Müller; Philips Research Laboratories; International Workshop on Aspect-Oriented Programming at ECOOP, 1992; 3 Pages.

A Version Model for Aspect Dependency Management by Elke Pulvermüller et al.; J. Bosh (Ed.): GCSE 2001, LNCS 2186, Springer-Verlag Berlin Heidelberg 2001, pp. 70-79.

Can AOP Support Extensibility in Client-Serer Architectures? by Yvonne Coady et al.; European Conference on Object-Oriented Programming (ECOOP); Aspect-Oriented Workshop, Jun. 2001; pp. 1-4.

Mapping Requirements to Architecture: an Experience Report from the VIVIAN Project by Titos Saridakis; Proceedings of the 14th International Conference on Software and Systems Engineering and their Applications, Dec. 2001; pp. 1-6.

Functionality Needed in Middleware for Future Mobile Computing Platforms by Kimmo Raatikainen; Middleware for Mobile Computing Workshop held at IFIP/ACM Middleware Conference, Heidelberg, Germany, 2001; 10 Pages.

Aspects & Crosscutting in Layered Middleware Systems by Lodewijk M.J. Bergmans et al.; Trese Group-Center for Telematics and Information Technology (CTIT); pp. 1-3.

* cited by examiner

MOBILE MULTIMEDIA ENGINE

This application claims the benefit of now abandoned U.S. Provisional Patent Application Ser. Nos. 60/357,291 filed on Feb. 15, 2002, 60/412,756 filed on Sep. 23, 2002, and 60/412,875 filed on Sep. 23, 2002.

BACKGROUND OF THE INVENTION

1. Technical Field of the Invention

The present invention relates generally to the field of wireless telecommunications; and, more particularly, to a mobile multimedia system for a mobile terminal for a wireless telecommunications system.

2. Description of Related Art

Since cellular phones were first introduced in the 1980's, mobile terminals (Mobile Stations) utilized in the systems have become increasingly more complex. Initially, mobile terminals were designed primarily to provide voice telephony services, i.e., to transmit and receive voice communications. In later years, mobile terminals were developed that also included the ability to transfer user data not related to that of a voice telephone call. Such user data included, for example, data to be transferred over a dial-up networking connection initiated via a personal computer.

Currently, so-called "third generation" (3G) systems are being developed for future cellular telecommunications systems. 3G systems will combine high-speed Internet access with traditional voice communication, and will provide a user with access to Internet browsing, streaming audio/video, positioning, video conferencing and many other capabilities in addition to voice communication.

The Third Generation Partnership Project (3GPP) was established to ensure compatibility among the several 3G systems that are being developed around the world. The Universal Mobile Telephone System (UMTS) is being developed by 3GPP to provide a 3G system that includes terrestrial and satellite systems capable of delivering voice, data and multimedia anywhere in the world.

The drastically increased functionality that is being included in cellular telecommunications systems via the 3GPP standardization has placed substantial demands on the developers of mobile terminals to be used in the systems. This demand is exacerbated by the fact that a mobile terminal is a "resource scarce" environment that is limited in size, memory and power.

Traditionally, mobile terminal manufacturers have designed, fabricated and marketed substantially complete mobile terminal systems that include all the hardware and software needed for basic terminal operation as well as the software needed to provide the features and capabilities desired by the manufacturer or a particular user based on their perception of market needs. Such a design approach does not provide the flexibility to quickly adapt to rapid changes in market demands or to satisfy the diverse requirements of multiple users.

Recognizing the above inadequacies of current mobile terminal designs, commonly assigned, U.S. patent application Ser. No. 10/359,835, filed Feb. 7, 2003, the disclosure of which is hereby incorporated by reference, describes a mobile terminal platform system for a mobile terminal for a wireless telecommunications system. The mobile terminal platform system includes a mobile terminal platform assembly, comprising both software and hardware, for the mobile terminal, and which is adapted to be designed, implemented (assembled) and tested as a complete, enclosed unit separate from application software. With the mobile terminal platform assembly described in the above-referred to application, users (the term "users" as used herein includes manufacturers, end users and other customers and users) can develop or otherwise acquire their own application software and add that software to the mobile terminal platform assembly at a later time to complete the platform system. The mobile terminal platform assembly can, accordingly, be sold or otherwise transferred to a plurality of different users, each of which can complete the platform system by loading, installing and running their own application software in the assembly in order to satisfy their own particular requirements for the platform system.

An important capability of current and future mobile terminals is the provision of multimedia functionality. In existing mobile terminals having a multimedia functionality, the multimedia applications themselves are required to provide much of the functionality, and this necessitates applications that are relatively complex and difficult to develop. This requirement also makes it difficult to develop a mobile terminal having multimedia functionality that will meet the diverse desires and requirements of multiple users.

There is, accordingly, a need for a mobile multimedia system for a mobile terminal for a wireless telecommunications system that permits the easy creation of powerful multimedia applications and that is capable of enabling multimedia applications that will meet the diverse needs of a plurality of users.

SUMMARY OF THE INVENTION

The present invention provides a mobile multimedia system for a mobile terminal for a wireless telecommunications system. The mobile multimedia system according to an exemplary embodiment of the invention comprises a mobile terminal platform assembly that includes a mobile multimedia engine having a software services component and a hardware component associated with and controlled by the software services component, and an interface component having at least one interface for providing access to the mobile multimedia engine. The mobile multimedia system further includes multimedia application software loaded, installed and run in the mobile multimedia engine of the mobile terminal platform assembly via the at least one interface in the interface component (the term "loaded" as used herein is intended to include any mechanism by which the application software can be combined with the software of the mobile multimedia engine via the interface including, for example, downloading from the Internet or installing a hardware chip).

The hardware and software components of the mobile multimedia engine of the mobile multimedia system of the present invention work together to provide the functionality needed to enable powerful multimedia applications, including the functionality to handle displays, cameras, network connections and persistent storage of multimedia content. Among the functions provided are audio/video playback, streaming audio/video, audio/video recording and video telephony.

The interface component of the mobile terminal platform assembly preferably comprises a middleware services layer that includes the at least one interface for loading installing and running the multimedia application software in the mobile multimedia engine; and, in addition, that isolates the mobile multimedia engine from the application software except via the at least one interface.

Further advantages and specific details of the present invention will become apparent hereinafter from the detailed description given below in conjunction with the following drawings.

DETAILED DESCRIPTION OF THE EXEMPLARY EMBODIMENTS OF THE INVENTION

Figure 1:
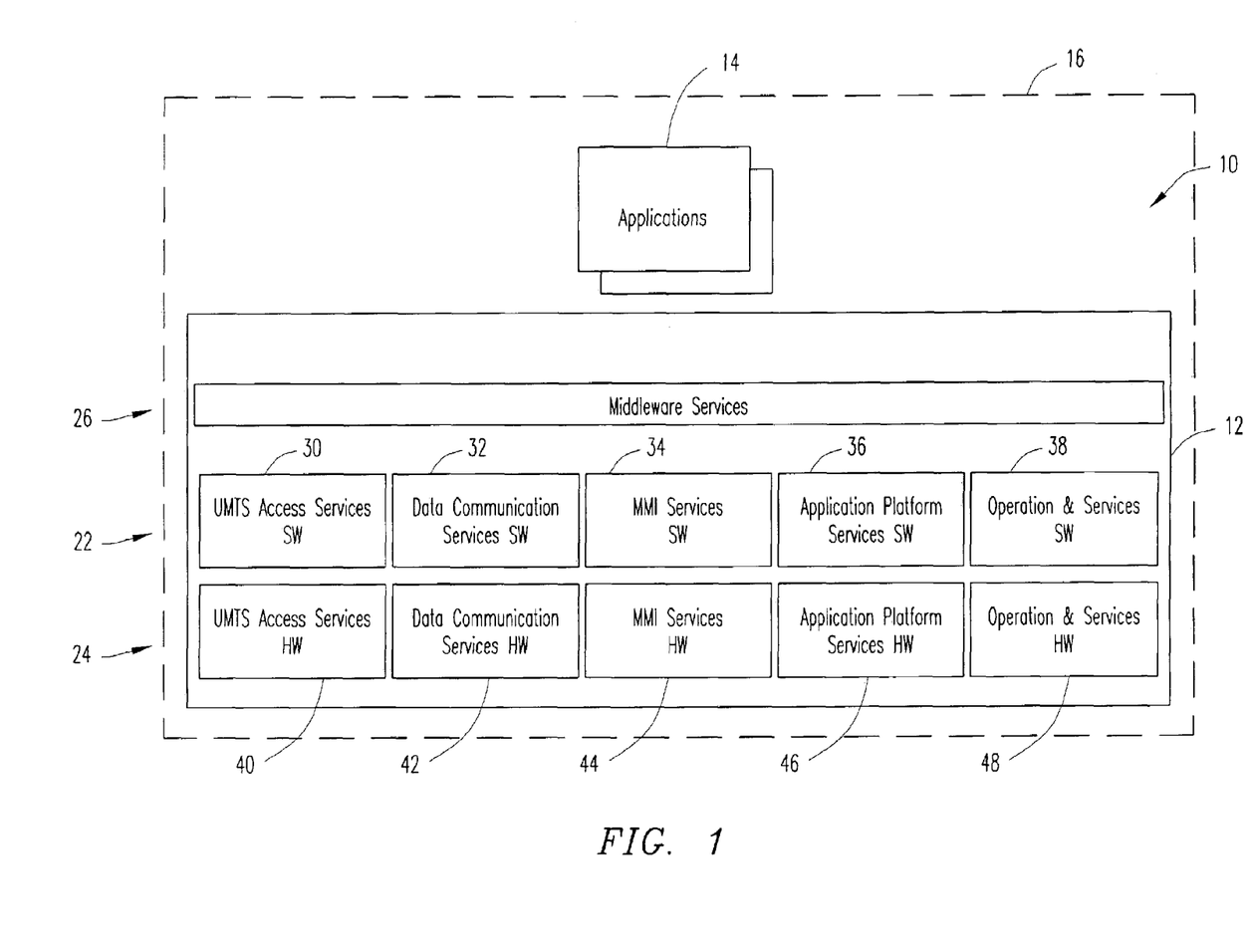
FIG. 1 is a block diagram that schematically illustrates a platform system for a mobile terminal for a wireless telecommunications system to assist in explaining the present invention.

FIG. 1 is a block diagram that schematically illustrates a platform system for a mobile terminal for a wireless telecommunications system to assist in explaining the present invention. The platform system is generally designated by reference number 10 and comprises a mobile terminal platform assembly 12 and one or more applications (i.e., application software) 14 that have been loaded, installed and run in the mobile terminal platform assembly. Platform system 10 is adapted to be incorporated in a mobile terminal generally designated by dotted line 16.

Mobile terminal platform assembly 12 includes a software services component 22, a hardware component 24 and an interface component 26.

Software services component 22 comprises a plurality of well-structured functional software units for providing services that are offered to users via interface component 26. In the exemplary system illustrated in FIG. 1, the plurality of software units comprise a plurality of vertically-oriented functional stacks including a UMTS access services software stack 30, a data communications services software stack 32, an MMI (Man-Machine Interface) services software stack 34, an application platform services software stack 36 and an operation and services software stack 38.

Hardware component 24 comprises a set of hardware units that are associated with and controlled by their respective functional software stacks. In the exemplary system illustrated in FIG. 1, the hardware units include UMTS access services hardware 40, data communications services hardware 42, MMI services hardware 44, application platform services hardware 46 and operation and services hardware 48.

Interface component 26 comprises a middleware services layer that includes at least one application programming interface (API) for loading, installing and running one or more applications 14 in mobile terminal platform assembly 12, that isolates the mobile terminal platform assembly from the applications using it, and that provides various other services for the applications.

Mobile terminal platform assembly 12 of platform system 10 is adapted to be designed, implemented (assembled) and tested as a complete, enclosed unit separate from the application software 14 (the term "application software" as used herein can be any software that provides the functionality that users may wish to have available). Users can, accordingly, develop or otherwise acquire their own application software and add that software to the mobile terminal platform assembly 12 at a later time in order to complete the platform system 10. Mobile terminal platform assembly 12 can, accordingly, be sold or otherwise transferred to a plurality of different users each of which can complete platform system 10 by loading, installing and running their own application software in the assembly in order to satisfy their own particular requirements for the platform system.

Figure 2:
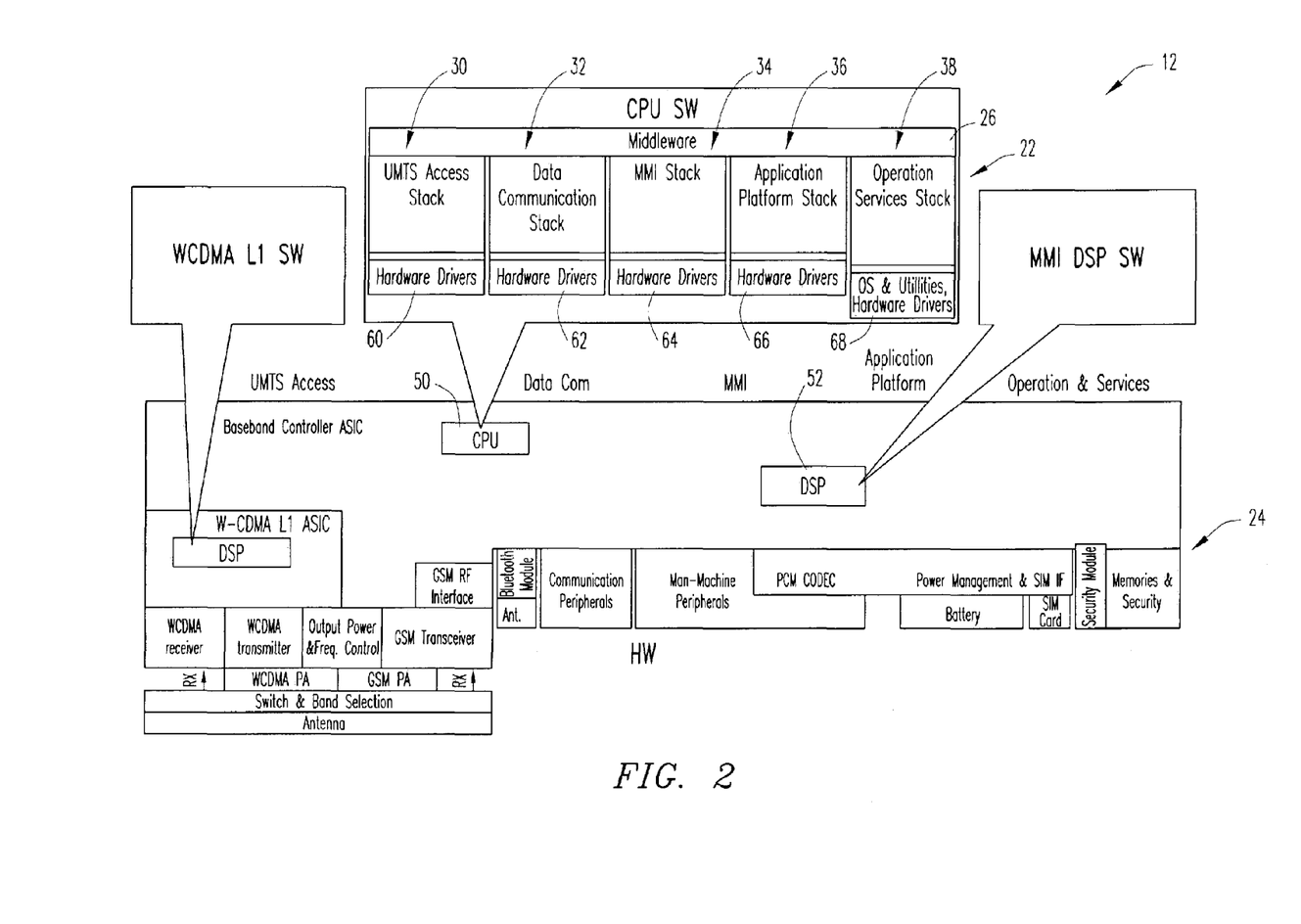
FIG. 2 is a block diagram that schematically illustrates a deployment view of the mobile terminal platform assembly of the platform system of FIG. 1 to further assist in explaining the present invention.

FIG. 2 is a block diagram that schematically illustrates one example of a deployment view of mobile terminal platform system 12 of FIG. 1 to further assist in understanding the present invention. As illustrated in FIG. 2, mobile terminal platform assembly 12 is controlled via software executing in a main CPU 50. The main CPU may comprise one or more processors such as microprocessors, micro programmable processors or DSPs (Digital Signal Processors). A DSP for MMI software services stack 34 is illustrated at 52. Software stacks 30-38 of software component 22 each include hardware driver software 60-68 to operate the hardware units associated with each stack. As shown in FIG. 2, exemplary of the hardware units that are controlled by the functional software stacks include a receiver, a transmitter, a power and frequency controller, a GSM transceiver, a Bluetooth module, various communication and man-machine peripherals, power management and SIM interface, memories and security hardware.

Further details of mobile terminal platform assembly 12 and platform system 10 are given in the above-mentioned commonly assigned U.S. patent application Ser. No. 10/359, 835, filed Feb. 7, 2003.

Figure 3:
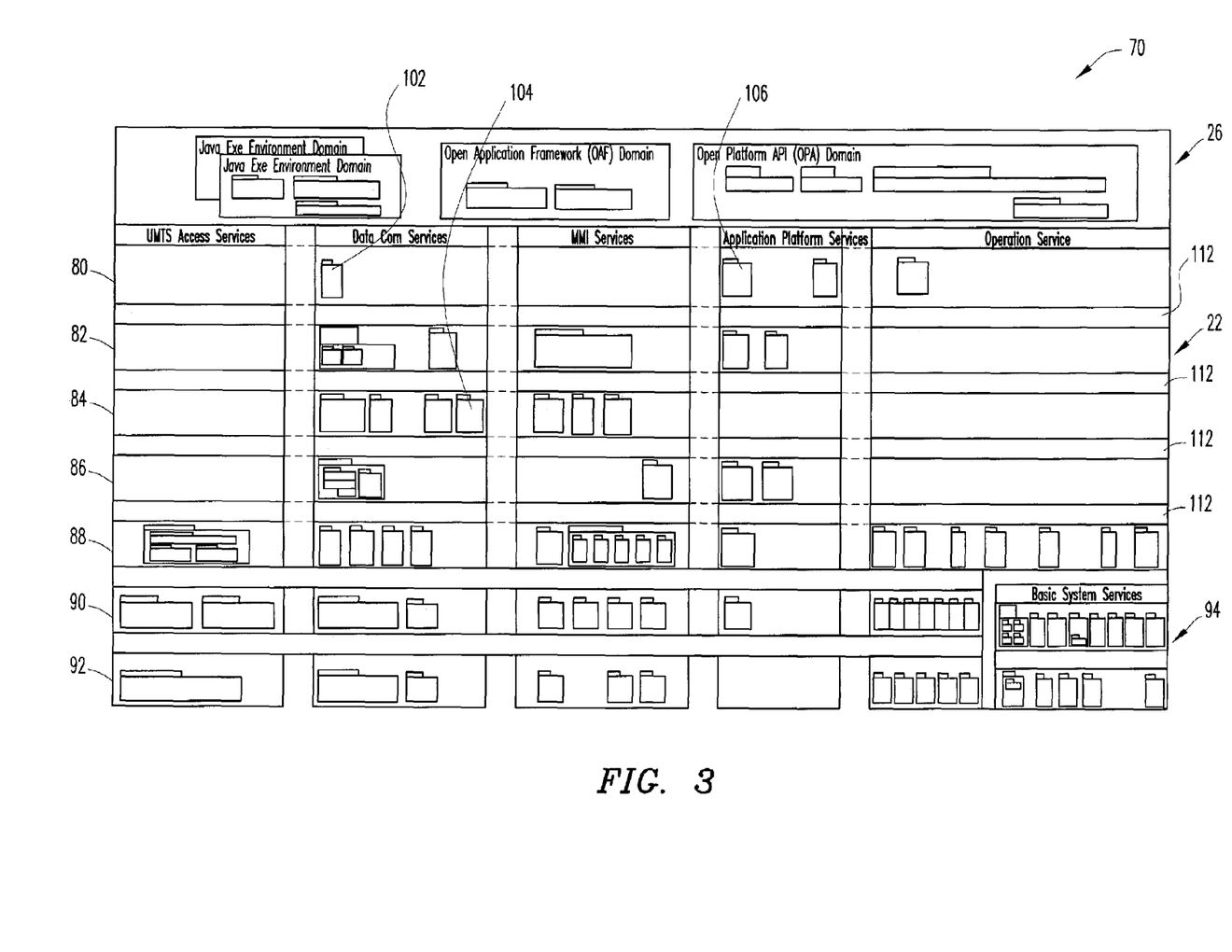
FIG. 3 is a block diagram that schematically illustrates the software architecture of the mobile terminal platform assembly of FIGS. 1 and 2 to further assist in explaining the present invention.

The software incorporated in mobile terminal platform assembly 12 is preferably organized in such a manner as to make the software easy to understand so that it can be more easily designed and more easily upgraded or otherwise modified. FIG. 3 is a block diagram that schematically illustrates the software architecture of mobile terminal platform assembly 12 to further assist in explaining the present invention.

As shown in FIG. 3, software services component 22, in addition to being organized into a plurality of vertical, functional software stacks as described above, is also arranged to define a plurality of horizontal layers such that the software of middleware services layer 26 and the software of software services component 22 together define a layered architecture, generally designated by reference number 70, in which the layers are arranged in descending order from a higher level service layer to a lower level service layer.

The highest layer is middleware services layer 26. The layers of software services component 22 include an application server layer 80 to provide application services, a platform services layer 82 to provide platform specific services for applications, a platform protocol layer 84 to provide session protocols and application specific protocols, a transport layer 86 to provide audio access/control, datacom transport protocols, messaging transport protocols and the like, a data access layer 88 to provide external data IF access, structured storage services and other low level platform support services, a logical drivers layer 90 and a physical drivers layer 92 encapsulating hardware dependencies. In addition, software services component 22 includes basic system services layers 94 that provide general services that are needed by the platform assembly.

The bottom two layers 90 and 92 constitute Hardware Abstraction Layers (HAL) which isolate the dependencies between the software and the hardware. Only the physical drivers layer is concerned with the details of the hardware (for example, which registers in the ASIC hardware are addressed). Logical drivers layer 90 provides a logical mapping to the hardware, i.e., this layer provides a bridge between the hardware and software parts of the mobile terminal platform assembly.

The software itself is organized into a plurality of software modules, e.g. modules 102, 104, 106. In software services component 22, a single module can reside in only one vertical functional stack and in only one horizontal layer within that stack. Each layer can contain from one to many modules, and all the modules in a particular layer in a particular stack have the same level of abstraction. Communication among the various modules is accomplished via a Software Back Plane (SwBP) 112, subject to a set of basic rules for software module-to-module access. These rules can be summarized as follows:

A software module may invoke functionality in all layer interfaces below its own layer.

There are no limitations for the direction of channel events or data streams. They may go in any direction.

A software module may never invoke functionality in layer interfaces (in the SwBP) above its own layer, independent of to which module the layers belong.

A software module may invoke functionality in the layer interface in its own layer in the same vertical stack.

A software module may invoke functionality in a software module in the same layer in another vertical stack. (This capability is permitted to limit the number of layers in the vertical stacks.)

There is no hard coupling between the various modules and the interfaces in the SwBP. As a result, the modules and/or the implementation of the interfaces can be freely changed without any impact on the clients to the interfaces. This is an important capability as it permits individual modules to be added, removed or changed without affecting other modules in the platform assembly.

Further details of the layered architecture, including the SwBP software structure that enables the internal communication between modules within the mobile terminal platform assembly, and of the middleware services layer are described in commonly assigned, U.S. patent application Ser. Nos. 10/359,911 and 10/359,772, both filed Feb. 7, 2003, the disclosures of which are hereby incorporated by reference.

In accordance with exemplary embodiments of the present invention, mobile terminal platform assembly 12 includes a mobile multimedia engine that is capable of enabling powerful multimedia applications that may be loaded, installed and run in the mobile multimedia engine via the at least one interface in the middleware services layer.

Figure 4:
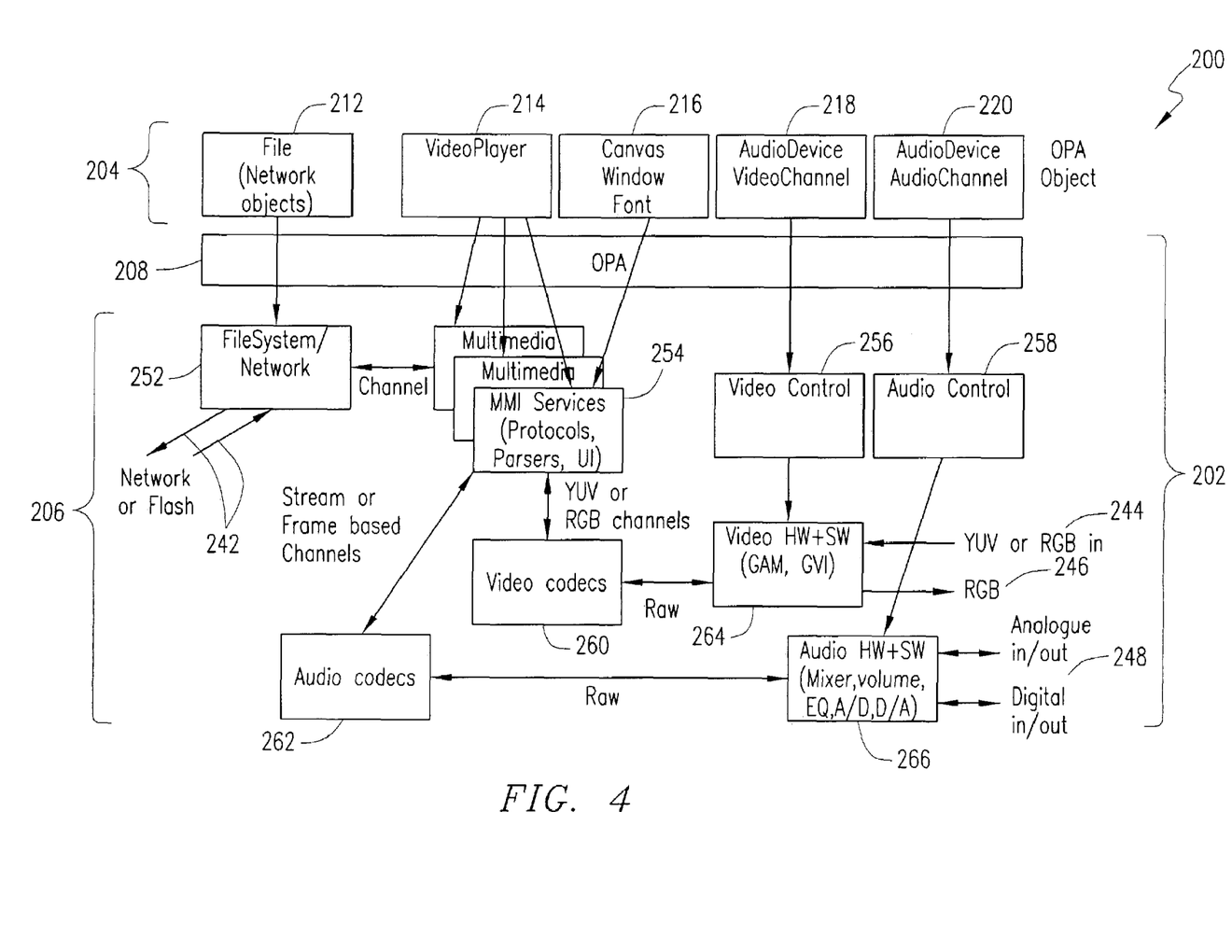
FIG. 4 is a block diagram that schematically illustrates a component view of a mobile multimedia system according to an exemplary embodiment of the present invention.
Figure 5:
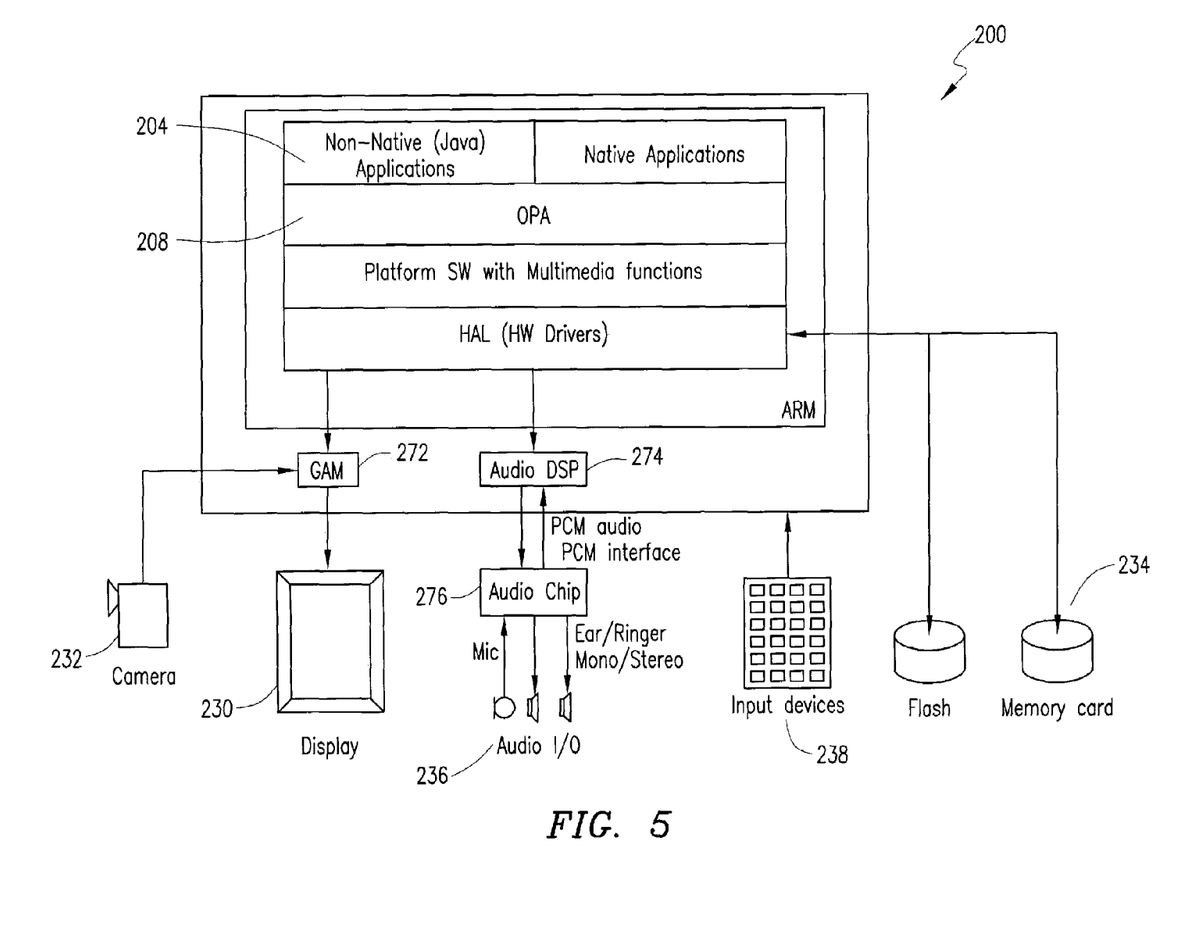
FIG. 5 is a block diagram that schematically illustrates a hardware view of the mobile multimedia system of FIG. 4 according to another exemplary embodiment of the present invention.

FIG. 4 is a block diagram that schematically illustrates a component view (including both software and hardware) of a mobile multimedia system according to an exemplary embodiment of the present invention, and FIG. 5 is a block diagram that schematically illustrates a hardware view of the mobile multimedia system of FIG. 4 (with software shown inside an ARM processor of the system). The system is generally designated by reference number 200, and comprises a mobile terminal platform assembly 202 and a plurality of multimedia applications (multimedia application software) 204, sometimes referred to herein as multimedia application objects or OPA (Open Platform API) objects. Mobile terminal platform assembly 202 includes software and hardware which together comprise a mobile multimedia engine 206, and an interface component 208 through which the application objects 204 can access and utilize mobile multimedia engine 206.

According to an exemplary embodiment of the present invention, mobile terminal platform assembly 202 corresponds to mobile terminal platform assembly 12 of mobile terminal platform system 10 illustrated in FIG. 1, and mobile multimedia engine 206 is incorporated in MMI services software stack 34 and in MMI services hardware 44 of the system of FIG. 1. In addition, interface component 208 in FIGS. 4 and 5 corresponds to middleware services layer 26 in the system of FIG. 1. It should be understood, however, that this is intended to be an exemplary embodiment only, and that it is not intended to limit the invention to any particular implementation.

Multimedia application objects 204 may comprise native and/or non-native (e.g. Java) applications, and as shown in FIG. 4, include File (Network Objects) application object 212, Video Player application object 214, Canvas, Window, Font application object 216, Video Device, Video Channel application object 218 and Audio Device, Audio Channel application object 220. Each application object accesses mobile multimedia engine 206 via application interface software (OPA) in middleware services layer 208.

In the exemplary embodiment of FIGS. 4 and 5, mobile multimedia engine 206 comprises both software and hardware that together enable multimedia application objects 204 in a mobile terminal that has WCDMA/GSM (Wideband Code Division Multiple Access/Global System for Mobile Communications) network ability. This is also intended to be exemplary only, as the invention is not limited to any particular wireless telecommunications system.

As schematically illustrated in FIG. 5, mobile multimedia engine 206 includes the functionality to handle various external devices including display devices 230, cameras 232, persistent memory devices 234, audio devices 236 and input devices 238. Towards this end, mobile multimedia engine 206 includes a plurality of interfaces to the external devices. As schematically illustrated in FIG. 4, these interfaces include interfaces to a WCDMA/GSM radio network and persistent memory (e.g., internal flash or removable media card) 242, YUV or RGB in from camera 244, RGB out to display 246 and analog/digital audio in/out 248 (both stereo and mono).

In general, mobile multimedia engine 206 includes the functionality to handle display, camera, network connections and persistent storage of multimedia content. It also includes a variety of decoders/encoders for audio, video and images. Functions provided by the mobile multimedia engine are audio/video playback, streaming audio/video, audio/video recording and video telephony.

As illustrated in FIG. 4, the software and hardware components that comprise mobile multimedia engine 206 include components relating to file system/network 252, MMI services 254 (e.g., protocols, parsers and UI), video control 256, audio control 258, video codecs 260, audio codecs 262, video hardware and software 264 and audio hardware and software 266.

An important aspect of the present invention is that multimedia data is not transported to/from a multimedia application. This enables full multimedia performance for audio and video regardless of the application programming language.

In accordance with the present invention, an application object is only required to set up and control the mobile multimedia engine 206. All processing, data handling and data transport is performed inside the mobile multimedia engine. As a result, multimedia data is not transported to/from an application object and this permits thin application objects to make use of the multimedia functionality of the mobile multimedia engine.

Mobile multimedia engine 206 utilizes hardware acceleration to perform its tasks. Specifically, as shown in FIG. 5, video and imaging is enhanced in GAM (Graphics Acceleration Module) hardware 272, and audio makes use of an audio DSP (Digital Signal Processor) hardware block 274 and an audio chip 276.

Figure 6:
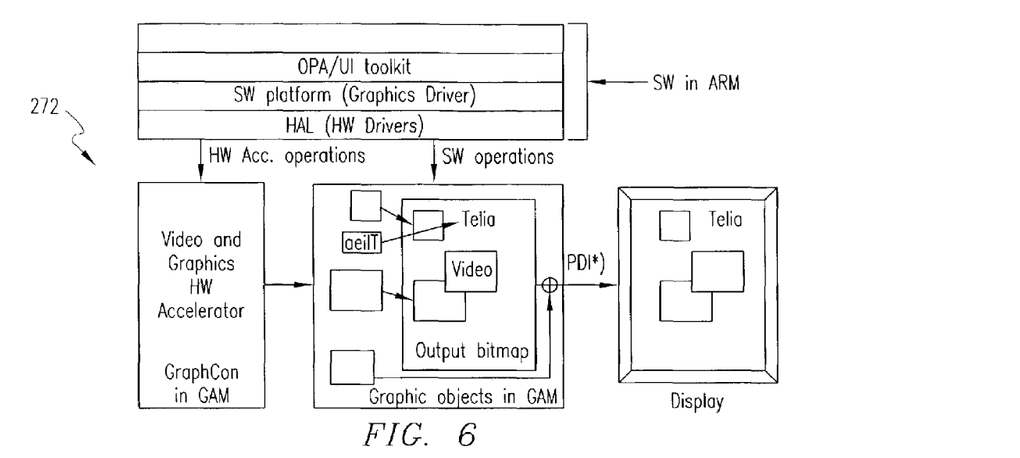
FIG. 6 is a block diagram that schematically illustrates multimedia objects inside the Graphics Acceleration Module memory of the mobile multimedia engine of FIGS. 4 and 5 according to another exemplary embodiment of the present invention.

FIG. 6 is a block diagram that schematically illustrates multimedia objects (video and images) inside the GAM memory 272. Graphics acceleration in GAM include:

Graphics overlay with video and camera transparency in hardware with integrated zoom, resize, dithering and color conversion that supports a variety of displays and cameras.

Display refresh that performs updates of graphics, video and camera overlay and color conversion in one go.

DSP for audio acceleration synchronized with video accelerator (A/V sync).

The mobile multimedia engine provides a logical video channel from file/network to the display showing the video.

The mobile multimedia engine provides a logical video channel from camera to file/network to record or send video.

Figure 7:
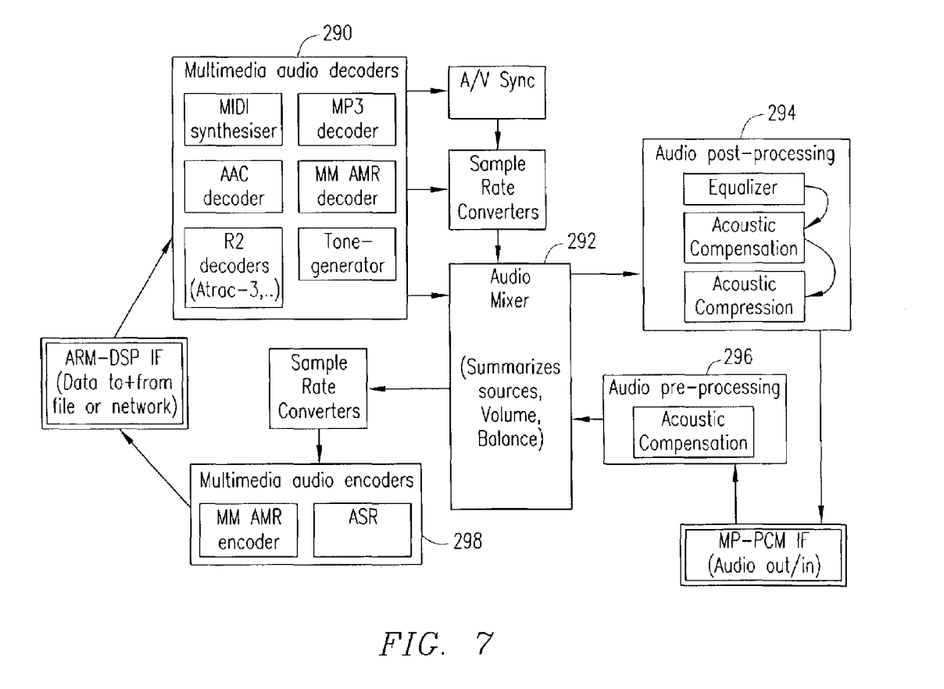
FIG. 7 is a block diagram that schematically illustrates multimedia components and audio chain when playing multimedia content using the audio DSP of the mobile multimedia engine of FIGS. 4 and 5 according to another exemplary embodiment of the present invention.
Figure 8:
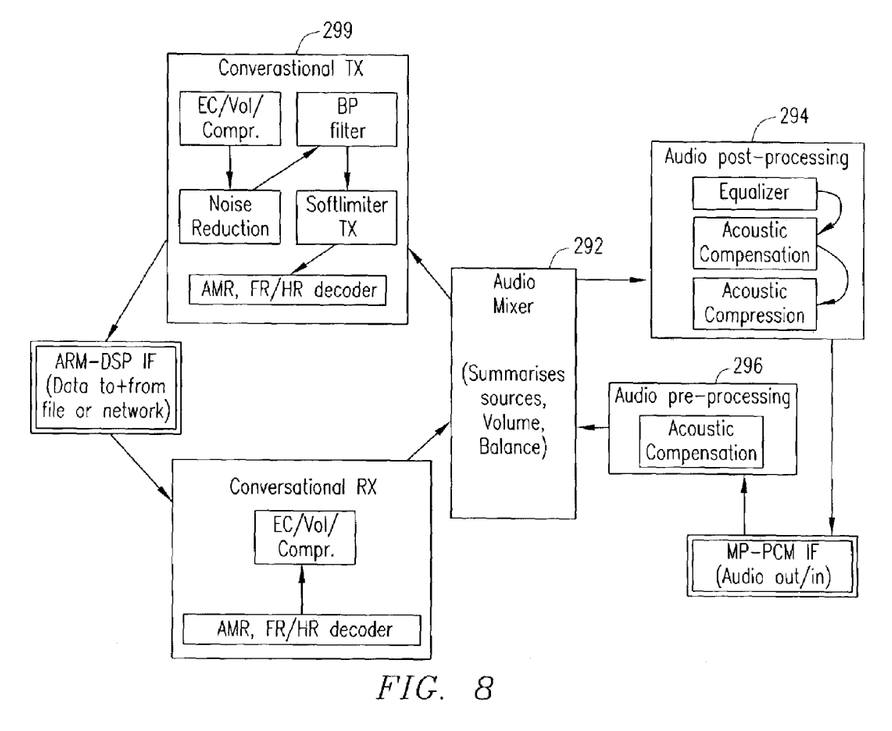
FIG. 8 is a block diagram that schematically illustrates the audio DSP of the mobile multimedia engine of FIGS. 4 and 5 working with conversational audio according to another exemplary embodiment of the present invention.

FIG. 7 is a block diagram that schematically illustrates multimedia components and audio chain when playing multimedia content using audio DSP 274, and FIG. 8 is a block diagram that schematically illustrates the audio DSP working with conversational audio (e.g., in connection with a voice call or video telephony). As shown in FIG. 7, the multimedia components include multimedia audio decoders 290, an audio mixer 292, audio post-processing components 294, audio pre-processing components 296 and multimedia audio encoders 298 as well as other components illustrated in the FIGURE. As shown in FIG. 8, the conversational components include conversational components 299 in addition to an audio mixer 292, audio post-processing components 294 and audio preprocessing components 296 as well as other components illustrated in the FIGURE.

Audio hardware acceleration includes:

The mobile multimedia engine provides a logical audio channel from network/file to loudspeaker.

The mobile multimedia engine provides a logical audio channel from microphone to file/network.

According to exemplary embodiments, all external interfaces of mobile multimedia engine 206 of mobile multimedia system 200 of the present invention can be configured by dynamic settings. This capability makes the mobile multimedia engine highly adaptable to different multimedia hardware components including flash memories, microphones, loudspeakers, displays and cameras.

With respect to acoustic components, in particular, the mobile multimedia engine is configurable to support a variety of products with different form factors and acoustic properties. The acoustic configuration is changeable in runtime to support connection of user definable audio accessories including vehicle hands-free, Bluetooth vehicle hands-free, Bluetooth headset, portable hands-free, hand-held and office hands-free, etc.

The acoustic configuration may be downloadable via the Internet or another data link after release of the mobile terminal to a user if the user wishes to support new acoustic components. In addition, the acoustic configuration may also support a variety of acoustic profiles with different audio properties (may be downloadable via the Internet or any data link).

The display driver is a script describing the hardware signals to perform logical functions to any kind of display that supports the electrical properties of the hardware interface. This means that the mobile multimedia engine can support one or more displays by providing a new setting to the engine.

The camera driver is a script describing the hardware signals to perform logical functions to any kind of camera that supports the electrical properties of the hardware interface. This means that the mobile multimedia engine can support one or more cameras by providing a new setting to the engine.

The multimedia start up and shut down show can be configured to run during startup/shutdown of the engine.

The mobile multimedia engine has the capability of adding decoders/encoders in runtime via dynamic linking of components that hold software for both the main processor and the audio DSP. The audio DSP is capable of supporting different multimedia content formats via the downloadable codec architecture. The mobile multimedia engine also has defined interfaces for codecs and can make use of any codec that complies with the interface. Codecs may be downloaded via the Internet on demand or otherwise installed in the mobile multimedia engine.

Figure 9:
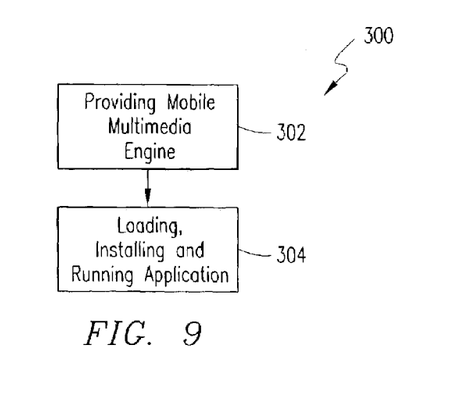
FIG. 9 is a flow chart that schematically illustrates steps of a method for enabling a multimedia application in a mobile terminal according to another exemplary embodiment of the present invention.

FIG. 9 is a flow chart that schematically illustrates steps of a method for enabling a multimedia application in a mobile terminal according to another exemplary embodiment of the present invention. The method is generally designated by reference number 300, and begins with providing a mobile multimedia engine in a mobile terminal (step 302). As described above, in exemplary embodiments of the invention, the mobile multimedia engine is incorporated in a mobile terminal platform assembly that includes a software component, a hardware component associated with and controlled by the software component, and an interface component for providing access to the software component via at least one interface in the interface component. The method further includes the step of loading, installing and running at least one multimedia application in the mobile multimedia engine via the at least one interface in the interface component. (step 304).

While what has been described constitutes exemplary embodiments of the present invention, it should be recognized that the invention can be varied in many ways without departing therefrom. Because the invention can be varied in numerous ways, it should be understood that the invention should be limited only insofar as is required by the scope of the following claims.

We claim:

1. A mobile multimedia system for a mobile terminal for a wireless telecommunications system, comprising:
   a mobile terminal platform assembly, said mobile terminal platform assembly including:
   a mobile multimedia engine having a software services component and a hardware component associated with and controlled by said software services component,
   an interface component having at least one interface for providing access to the mobile multimedia engine, a middleware services layer that includes the at least one interface, wherein said interface includes an application program interface for loading installing and running the multimedia application software in the multimedia engine, that isolates the mobile multimedia engine from the multimedia application software except via the at least one interface; and
   multimedia application software loaded, installed and run in said mobile multimedia engine of said mobile terminal platform assembly via said at least one interface in said interface component.

2. The mobile multimedia system according to claim 1, wherein the software component and the hardware component of said mobile multimedia engine includes software and hardware to provide one or more multimedia functions including one or more of audio/video playback, streaming audio/video, audio/video recording and video telephony.

3. The mobile multimedia system according to claim 2, wherein said mobile multimedia engine includes one or more external interfaces to one or more external devices.

4. The mobile multimedia system according to claim 3, wherein said one or more external interfaces include one or more external interfaces to one or more of a display device, a camera, a persistent memory device, an audio device and an input device.

5. The mobile multimedia system according to claim 1 wherein said multimedia application software includes one or more of multimedia application objects including a File network application object, a Video Player application object, a Canvas, Window, Font application object, a Video Device, Video Channel application object and an Audio Device, Audio Channel application object.

6. The mobile multimedia system according to claim 1, wherein said hardware component includes a Graphics Acceleration Module for enhancing video and imaging and an audio Digital Signal Processor for enhancing audio.

7. The mobile multimedia system according to claim 1, adapted for use in a WCDMA/GSM wireless telecommunications system.

8. A mobile terminal platform assembly for a mobile multimedia system for a wireless telecommunications system, comprising:
   a mobile multimedia engine having a software services component and a hardware component associated with and controlled by said software services component;
   at least one multimedia application software;
   an interface component having at least one interface for providing at least one multimedia application with access to the mobile multimedia engine, and
   a middleware services layer that includes the at least one interface, wherein said interface includes an application program interface for loading, installing and running the multimedia application software in the multimedia engine, that isolates the mobile multimedia engine from the multimedia application software using it.

9. The mobile terminal platform assembly according to claim 8, wherein the software component and the hardware component of said mobile multimedia engine includes software and hardware to provide one or more multimedia functions including one or more of audio/video playback, streaming audio/video, audio/video recording and video telephony.

10. The mobile terminal platform assembly according to claim 9, wherein said mobile multimedia engine includes one or more external interfaces to one or more external devices.

11. The mobile terminal platform assembly according to claim 10, wherein said one or more external interfaces include one or more external interfaces to one or more of a display device, a camera, a persistent memory device, an audio device and an input device.

12. The mobile terminal platform assembly according to claim 8, wherein said multimedia application software includes one or more of multimedia application objects including a File network application object, a Video Player application object, a Canvas, Window, Font application object, a Video Device, Video Channel application object and an Audio Device, Audio Channel application object.

13. The mobile terminal platform assembly according to claim 8, wherein said hardware component includes a Graphics Acceleration Module for enhancing video and imaging and an audio Digital Signal Processor for enhancing audio.

14. The mobile terminal platform assembly according to claim 8, adapted for use in a WCDMA/GSM wireless telecommunications system.

15. A mobile terminal for a wireless telecommunications system comprising:
   a mobile multimedia engine having a software services component and a hardware component associated with and controlled by said software services component;
   a multimedia application software;
   an interface component having at least one interface for providing at least one multimedia application with access to the mobile multimedia engine, and
   a middleware services layer that includes the at least one interface, wherein said interface includes an application program interface for loading, installing and running the multimedia application software in the multimedia engine, that isolates the mobile multimedia engine from the multimedia application software except via the at least one interface.

16. The mobile terminal according to claim 15, wherein said mobile multimedia engine includes one or more external interfaces to one or more external devices.

17. The mobile terminal according to claim 15, wherein said hardware component includes a Graphics Acceleration Module for enhancing video and imaging and an audio Digital Signal Processor for enhancing audio.

18. The mobile terminal according to claim 15, adapted for use in a WCDMA/GSM wireless telecommunications system.

19. A method for enabling multimedia applications in a mobile terminal for a wireless telecommunications system, comprising:
- providing a mobile terminal platform assembly that includes a mobile multimedia engine having a software services component and a hardware component associated with and controlled by the software services component,
- a multimedia application software;
- an interface component having at least one interface for providing at least one multimedia application with access to the mobile multimedia engine, and
- a middleware services layer that includes the at least one interface, wherein said interface includes an application program interface for loading, installing and running the multimedia application software in the multimedia engine, that isolates the mobile multimedia engine from the multimedia application software except via the at least one interface.

20. The method according to claim 19, wherein said at least one multimedia application includes one or more of multimedia application objects including a File network application object, a Video Player application object, a Canvas, Window, Font application object, a Video Device, Video Channel application object and an Audio Device, Audio Channel application object.

* * * * *